(12) United States Patent
Karlsson et al.

(10) Patent No.: US 7,166,227 B2
(45) Date of Patent: Jan. 23, 2007

(54) METHOD OF TREATING DIGESTED SLUDGE

(75) Inventors: Göran Karlsson, Helsingborg (SE); Ingemar Karsson, Lidingö (SE); Lennart Pettersson, Helsingborg (SE); Michael Recktenwald, Helsingborg (SE)

(73) Assignee: Kemira Kemi AB, Helsingborg (SE)

( * ) Notice: Subject to any disclaimer, the term of this patent is extended or adjusted under 35 U.S.C. 154(b) by 174 days.

(21) Appl. No.: 10/829,328

(22) Filed: Apr. 22, 2004

(65) Prior Publication Data

US 2005/0000908 A1 Jan. 6, 2005

(30) Foreign Application Priority Data

Apr. 23, 2003 (SE) .................... 0301171

(51) Int. Cl.
*C02F 11/14* (2006.01)
(52) U.S. Cl. ............ 210/712; 210/721; 210/722; 210/724; 210/727; 210/906; 210/916
(58) Field of Classification Search ............ 210/609
See application file for complete search history.

(56) References Cited

U.S. PATENT DOCUMENTS

| | | | | |
|---|---|---|---|---|
| 4,221,661 A * | 9/1980 | Shimizu et al. | ............ | 210/721 |
| 4,377,486 A * | 3/1983 | Barrick et al. | ............ | 210/712 |
| 5,051,191 A * | 9/1991 | Rasmussen et al. | ........ | 210/721 |
| 5,720,882 A * | 2/1998 | Stendahl et al. | ............ | 210/638 |
| 5,888,404 A * | 3/1999 | Jokinen | ............ | 210/711 |
| 6,217,768 B1 * | 4/2001 | Hansen et al. | ............ | 210/622 |
| 6,368,511 B1 | 4/2002 | Weissenberg et al. | ...... | 210/759 |
| 6,855,256 B1 * | 2/2005 | Blais et al. | ............ | 210/620 |

FOREIGN PATENT DOCUMENTS

| | | |
|---|---|---|
| EP | 0 832 853 A2 | 4/1998 |
| JP | 57-004299 A | 1/1982 |
| WO | WO 95/06004 A1 | 3/1995 |
| WO | WO 96/20894 A1 | 7/1996 |
| WO | WO 98/41479 A1 | 9/1998 |
| WO | WO 03/045851 A1 | 6/2003 |
| WO | WO 03/045852 A1 | 6/2003 |

OTHER PUBLICATIONS

E. Neyens et al., *Journal of Hazardous Materials*, vol. B98, (2003), pp. 33-50.
E. Neyens et al., *Journal of Hazardous Materials*, vol. B98, (2003), pp. 91-106.

* cited by examiner

*Primary Examiner*—Peter A. Hruskoci
(74) *Attorney, Agent, or Firm*—Birch, Stewart, Kolasch & Birch, LLP

(57) ABSTRACT

A method of treating, in wastewater purification, sludge containing organic matter, divalent iron and phosphorus, in which
the sludge that is treated is made to contain dissolved iron and phosphorus at a molar ratio Fe:P of above 1:1,
the sludge is treated at 0–100° C. with an acid at a pH of 1–5 for dissolution of divalent iron and phosphorus from the sludge,
the sludge is supplied with an oxidizer selected from hydrogen peroxide and percompounds, wherein divalent iron is oxidized by Fenton's reaction to trivalent iron, and
(i) trivalent iron is precipitated as trivalent iron phosphate
(ii) free radicals with a deodorization and sanitation effect are formed by Fenton's reaction,
the sludge is then dewatered at a pH of at most 7, and
the aqueous solution obtained in dewatering is recirculated to the wastewater purification.

14 Claims, 1 Drawing Sheet

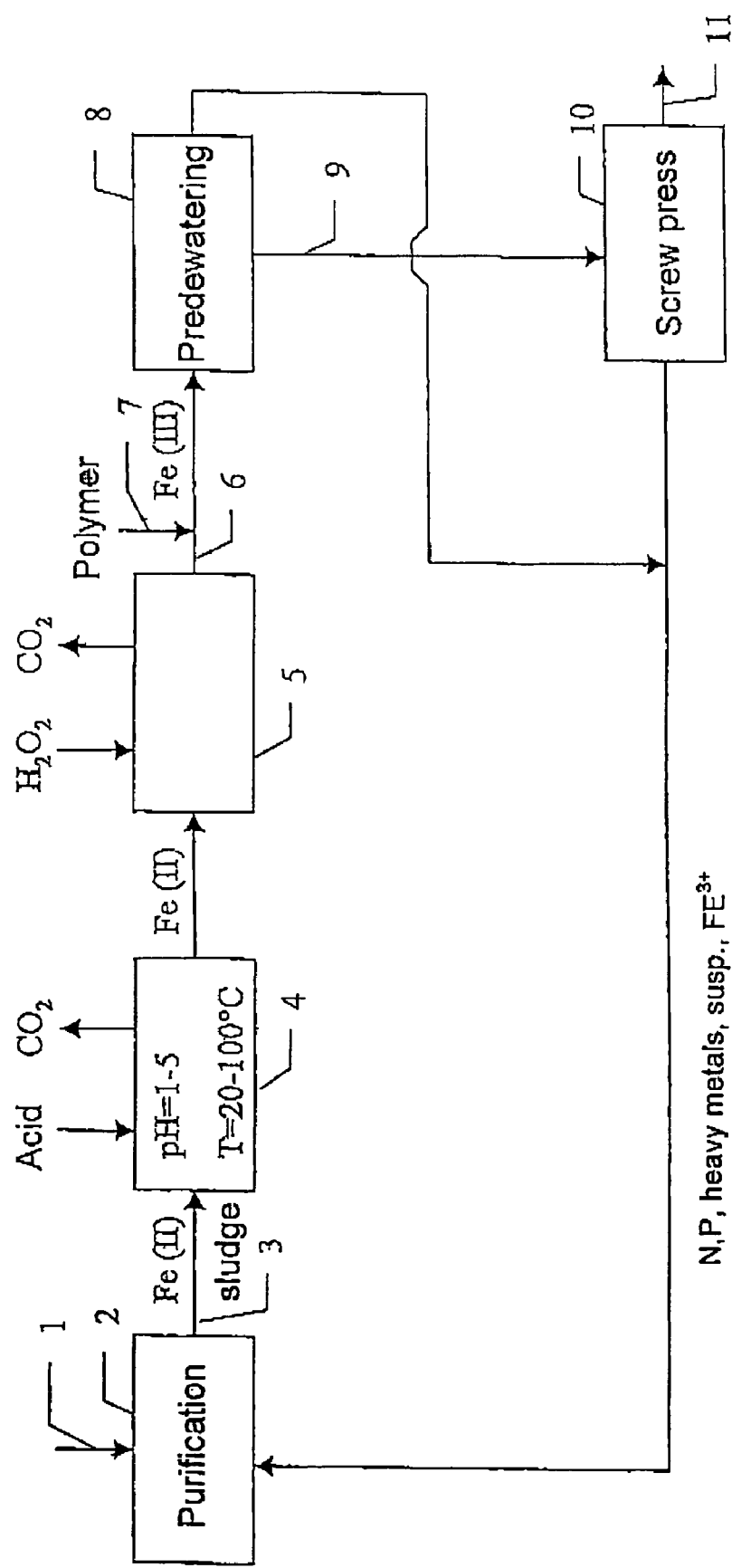

METHOD OF TREATING DIGESTED SLUDGE

This Non-provisional application claims priority under 35 U.S.C. § 119(a) on Patent Application No(s). 0301171-5 filed in Sweden on Apr. 23, 2003, the entire contents of which are hereby incorporated by reference.

FIELD OF THE INVENTION

The present invention relates to a method of treating sludge. More specifically, the invention relates to a method of treating, in wastewater purification, sludge obtained from sewage works. The invention is especially useful in treatment of sludge from municipal sewage works and will therefore be described below with reference thereto. However, the invention is not limited to treatment of sludge from municipal sewage works, but is also applicable in treatment of sludge from other types of sewage works, such as sewage works for purification of industrial wastewater.

BACKGROUND ART

The water that is purified in municipal sewage works is collected from a large number of sources. It usually comprises the accumulated flows of domestic wastewater, surface water, partly purified industrial wastewater and rain water. In wastewater purification, first large objects that have got into the wastewater are removed. Moreover removal is made of particles and gravel, and finally organic matter, metals and nutrient salts, such as nitrogen and phosphorus compounds.

Normal wastewater purification in Sweden comprises mechanical, biological and chemical purification of the water. A grating separates the coarsest impurities, after which sand and heavier particles settle in a first settling step, referred to as a sand trap, before the chemical and/or biological purification starts.

Today's Swedish sewage works are built with extensive biological and chemical purification. Metal salts of aluminium or iron are used to precipitate phosphate. They can be added before, to or after the biological purification process (preprecipitation, simultaneous precipitation and postprecipitation respectively). Both the chemical and the biological treatment of the water generate sludge which settles and must be taken care of.

The generated sludges from the different sedimentations are usually collected in the sewage works involved. It is then usually a matter of primary sludge (mechanical sludge), secondary sludge (biological excess sludge) and tertiary sludge (chemical sludge). Sedimentation products from initial gratings and sand traps are usually not included in the thus collected sludge. The collected sludge is slightly thickened by additional settling and is then pumped into a digester. In the digester, the sludge is treated under anaerobic conditions for breakdown of organic matter and production of a reduced amount of sludge, referred to as digested sludge.

In wastewater purification as described above, large amounts of digested sludge are obtained, which must be taken care of. The digested sludge can, for instance, be deposited on landfill sites or be used as fertiliser. Depositing the digested sludge on landfill sites requires, however, large spaces and is costly. Use of digested sludge as fertiliser is preferred, but this use has been increasingly questioned since the sludge contains heavy metals and other undesirable substances. As an alternative to depositing on landfill sites and use as fertiliser, the digested sludge can be burnt. In Sweden, depositing of combustible waste on landfill sites was prohibited in 2002, and in 2005 depositing of all organic waste on landfill sites will be prohibited.

In view of that stated above, digested sludge that is to be incinerated should have as high a solids content as possible. Also in the case of another type of final storage of the dewatered sludge than incineration, it can be very important, above all in economical terms, to reduce the amount of sludge by dewatering the sludge to as high a solids content as possible. Reducing the amount of sludge by providing a high solids content of the digested sludge is difficult and has so far been achieved only at a high cost by a combination of mechanical dewatering and drying. It would therefore constitute a great improvement if a reduction of the amount of digested sludge, i.e. the weight and volume of the digested sludge, could easily be provided in a way other than by dewatering and drying only.

A further problem in treatment of digested sludge from wastewater purification is the disturbing and unpleasant smell that is associated with the digested sludge. This disturbing smell is an environmental problem and implies that plants for production and treatment of sludge from wastewater purification must often be located isolated from other buildings. It would therefore constitute an environmental advantage if the disturbing and unpleasant smell from the sludge could be reduced or eliminated.

A further problem is that sludge from wastewater purification often contains pathogenic bacteria, such as *salmonella*, *E. Coli* etc. It would be a great advantage if the sludge could be sanitised, i.e. treated so that such pathogenic bacteria are eliminated or reduced to a harmless level (for instance below 10 cfu/ml sludge with a solids content of 1–5%. "cfu"=colony forming units).

Yet another problem is that sludge from wastewater purification is in most cases sticky and difficult to handle and dewater. It would imply a considerable advantage if a sludge could be provided that is not sticky and is easy to handle and dewater.

Different methods for treatment of sludge from wastewater purification are known, and as an example mention can be made of WO 95/06004, which was published on 2 Mar. 1995, and WO 96/20894, which was published on 11 Jul. 1996. These two references concern treatment of sludge from wastewater purification for recovery of phosphorus and metal, for instance iron, from the precipitating chemical. The sludge can be treated with acid for dissolution of the metal and phosphorus content, after which phosphorus is precipitated as trivalent iron phosphate, in which case divalent iron can first be converted to trivalent iron by oxidisation with, for instance, hydrogen peroxide.

As a further example, mention can be of WO 98/41479, which was published on 24 Sep. 1998. This reference discloses a method for treatment of sludge from waste-water purification, in which iron and/or aluminium from the precipitating chemicals is dissolved from the sludge and the formed solution is recirculated to the wastewater purification. In a first step, the sludge is subjected to acid hydrolysis. After hydrolysis, the remaining sludge and hydrolysis liquid are fed to a second step for separation of the remaining sludge.

A further example of prior-art technique regarding sludge treatment is EP 0 832 853. This reference concerns a method of removing undesirable smell from sludge from biological wastewater purification and improving the filterability of the sludge. In the method, sludge at a pH of 2–6 is mixed with an iron(II)salt and hydrogen peroxide. pH is adjusted using an acid, such as sulphuric acid, which suitably is added simultaneously with the iron(II)salt. An exothermal reaction is obtained, which generates a temperature of 10–38° C. of the reaction mixture, without heating being required.

One more example of prior-art technique regarding sludge treatment is U.S. Pat. No. 6,368,511 which discloses a method for improving the dewatering of sludge. In the method, the sludge is subjected to an acid oxidative preconditioning at a pH below 5. Acidification occurs with hydrochloric acid to prevent subsequent problems with precipitation of gypsum, as would be the case in acidification using sulphuric acid. In the preconditioning, divalent iron ions and hydrogen peroxide are added, thereby forming Fenton's reagents which cause a partial oxidative breakdown of organic sludge components. Then an inorganic postconditioning is carried out by the preconditioned sludge being mixed with alkaline earth metal oxides, such as calcium hydroxide, in order to increase the pH to 9–11. Subsequently the sludge is dewatered.

Journal of Hazardous Materials B98 (2003) 33–50, "A Review of Classic Fenton's Peroxidation as an Advanced Oxidation Technique" provides a survey of Fenton's reaction. It also describes use thereof to improve the dewatering capacity of sewage sludge, However, no particular acid treatment of the sludge is described. Nor is the phosphorus content of the sludge stated, nor that this is precipitated as trivalent iron phosphate.

Journal of Hazardous Materials B98 (2003), 91–106 "Pilot-Scale Peroxidation ($H_2O_2$) of Sewage Sludge" describes treatment of sewage sludge on a pilot scale by Fenton's reaction in order to improve the dewatering capacity. According to the article, optimal conditions are pH 3, addition of 5–50 g $H_2O_2$/kg solid matter, 1.67 $Fe^{2+}$/kg solid matter at ambient temperature and pressure for 60–90 min. After reaction, neutralisation was carried out by adding calcium hydroxide. A special acid treatment of the sludge is not described. Nor is it stated that the phosphorus content of the sludge is precipitated as trivalent iron phosphate. Instead it is evident that the dissolution of phosphorus to the aqueous phase has increased, and also that the dissolution of nitrogen has increased significantly.

Patent Abstracts of Japan, Vol. 006, No. 063 and JP 57,004,299 (EBARA INFILCO CO LTD), 1982, describe a method for sludge treatment, in which first an oxidiser, such as hydrogen peroxide, and a metal ion dissociating material, such as ferrosulphate, are added to the sludge. Subsequently the sludge is treated under acid conditions, for instance with sulphuric acid, after which the treated sludge is dewatered.

WO 03/045851, which was published on 5 Jun. 2003, discloses a method for treatment of sludge from waste-water purification, the sludge being acidified in two steps and treated with a solution of ferrisalt and hydrogen peroxide in an amount 5–40 kg Fe/tonne of dry sludge and respectively 5–40 kg $H_2O_2$/tonne of dry sludge. The sludge is flocculated by adding an organic polymer, after which the flocculated sludge is dewatered.

WO 03/045852, which was published on 5 Jun. 2003, comprises the same method as WO 03/045851, except that acidification preferably occurs in one and the same step.

An object of the present invention is to provide a method of treating sludge from wastewater purification in order to easily and effectively reduce the amount thereof, i.e. weight and/or volume thereof.

Another object of the invention is to provide a method of treating sludge, by which the sludge is deodorised, i.e. the disturbing and unpleasant smell is removed from the sludge.

One more object of the invention is to provide a method of treating sludge, by which the sludge is sanitised.

A further object of the invention is to provide a method of treating sludge, which results in a sludge with improved dewatering capacity, i.e. a sludge that is easier and/or quicker to dewater;

SUMMARY OF THE INVENTION

According to the present invention, the above objects are achieved by sludge, which contains organic matter, divalent iron and phosphorus, first being acid treated. Then the sludge is subjected to an oxidising treatment, in which a precipitation of trivalent iron phosphate occurs. Moreover the sludge is oxidised according to Fenton's reaction for breakdown of organic matter, deodorisation and sanitation. After the oxidising treatment, the sludge is dewatered.

More specifically, according to the present invention a method is provided for treating, in wastewater purification, sludge containing organic matter, divalent iron and phosphorus, in which the sludge that is treated is made to contain dissolved iron and phosphorus at a molar ratio Fe:P of above 1:1, the sludge is treated at 0–100° C. with an acid at a pH of 1–5 for dissolution of divalent iron and phosphorus from the sludge, the sludge is supplied with an oxidiser selected from hydrogen peroxide and percompounds, wherein divalent iron is oxidised by Fenton's reaction to trivalent iron, and (i) trivalent iron is precipitated as trivalent iron phosphate (ii) free radicals with a deodorisation and sanitation effect are formed by Fenton's reaction, the sludge is then dewatered at a pH of at most 7, and the aqueous solution obtained in dewatering is recirculated to the wastewater purification.

Further features and advantages of the present invention will be evident from the following description and the appended claims.

BRIEF DESCRIPTION OF THE DRAWING

The accompanying drawing shows a schematic flow diagram of a method according to the invention for sludge treatment using acid treatment, oxidising treatment and dewatering of the sludge.

DETAILED DESCRIPTION OF THE INVENTION

In the method according to the invention, the sludge is preferably a sewage sludge from municipal sewage works, and more preferably a digested sludge, and the invention will therefore be described below with reference to treatment of a digested sludge, however, without the invention being limited thereto.

In the method according to the invention, the digested sludge is first subjected to an acid treatment at a pH of 1–5, preferably 1–4, more preferably 2–4, especially 3–4. In the acid treatment, the sludge should have a suitable solids content, for instance 1–6% by weight, such as 1–3% by weight, and if this is not the case the desired solids content is set before the acid treatment suitably by dissolution or dewatering, as required.

To achieve the desired pH in the acid treatment, an acid is added to the sludge. This acid can be selected from inorganic and organic acids. As examples of such acids, mention can be made of sulphuric acid, formic acid and oxalic acid. For cost reasons, for instance, it is preferred to use sulphuric acid.

The acid treatment can be carried out in one or more reactors connected in series. The acid treatment occurs within a temperature range from 0° C. to 100° C., preferably 20–100° C. Using a low temperature, such as ambient temperature, in the acid treatment gives the advantage that no, or only little, heating is required in the acid treatment. A further advantage of using a low temperature is that undesirable dissolution of nitrogen from organic matter in the digested sludge is prevented. Dissolution of nitrogen, which occurs in acid treatment at high temperatures, such as above 100° C., causes an increased nitrogen content in the filtrate obtained in the dewatering of the treated digested sludge. Since the filtrate is recirculated to the wastewater purification, this would involve an increased nitrogen load in the wastewater purification and accompanying requirements for nitrogen reduction, which would make the wastewater purification more expensive. Since the method according to the invention causes no, or insignificant, dissolution of nitrogen, this means a reduced or eliminated need for nitrogen reduction in the wastewater purification, which in turn means reduced costs.

The duration of the acid treatment is not critical, but it is preferred that the sludge be acid treated for a period of 10 min to 2 h.

The acid treatment causes a dissolution of inorganic matter. Thus, phosphorus and iron are dissolved from the sludge, in which case iron which has possibly been present as trivalent iron, is reduced to divalent. Above all inorganic phosphorus is dissolved from the sludge, In the acid treatment there also occurs some conversion of organic matter to, inter alia, carbon dioxide which escapes in gaseous form. At a low pH and/or at a high temperature also some dissolution of organic phosphorus can take place.

One condition in the invention is that the digested sludge contains iron and phosphorus. This usually means that the digested sludge has been obtained by purification of wastewater using iron compounds as precipitants. An important feature of the invention is also the molar ratio of iron to phosphorus in the sludge after dissolution. Thus the iron content of the sludge should be sufficient for precipitation of the content of dissolved phosphorus in the sludge and also sufficient for Fenton's reaction when adding an oxidiser to the sludge treated with acid. Moreover it might be desirable to have an excess of iron which after oxidation to trivalent form is recirculated to the water purification process for use as a precipitant. The content of iron in the digested sludge fed to the sludge treatment is mainly present as divalent iron or is converted to the same in connection with the acid treatment. When adding an oxidiser, divalent iron is oxidised to trivalent. Iron which is oxidised from divalent to trivalent state is used on the one hand to precipitate the content of dissolved phosphorus in the sludge as trivalent iron phosphate and, on the other hand, in Fenton's reaction, in which divalent iron is oxidised by an oxidiser, such as hydrogen peroxide, to trivalent iron during simultaneous release of hydroxyl ions and hydroxyl radicals according to the reaction formula $$H_2O_2 + Fe^{2+} \rightarrow Fe^{3+} + OH^- + OH\bullet$$

Any excess of both oxidised $Fe^{3+}$ and $Fe^{2+}$ can be recirculated to the water purification process for use as a precipitant.

The above means that the molar ratio of dissolved Fe to P in the method according to the invention must be above 1:1, such as at least 1.5:1, for instance about 2:1. Preferably, the molar ratio Fe:P is from above 1:1 to 2:1, preferably from above 1:1 to 1.5:1. This results in an excess of trivalent iron for recirculation to the water purification process.

In connection with the adding of oxidiser and oxidation of divalent iron to trivalent, the content of dissolved phosphorus in the sludge is precipitated as trivalent iron phosphate. The phosphorus content in the form of iron phosphate will be included in the finally treated sludge.

It the iron content of the original sludge is insufficient to carry out, in addition to precipitation of the dissolved phosphorus content of the sludge, also Fenton's reaction and possibly also form an excess of iron for recirculation to the water purification process, additional iron can be added to the sludge in the acid treatment and/or the adding of oxidiser. This additional iron is preferably added as divalent iron, for instance iron sulphate.

The oxidiser which is added in the invention is selected from hydrogen peroxide and compounds which in contact with oxidisable substances form hydrogen peroxide. More specifically, the oxidiser is selected from hydrogen peroxide and percompounds. Examples of preferred percompounds are sodium percarbonate and peracetic acid. Also combinations of two or more oxidisers can be used. It is particularly preferred to use hydrogen peroxide, conveniently in the form of an aqueous solution with a hydrogen peroxide content of 30–50% by weight, more preferably 30% by weight. The amount of added oxidiser is not critical but should be such as to be effective to perform Fenton's reaction and oxidise the sludge and also deodorise and sanitise it. When using hydrogen peroxide as oxidiser, this means that preferably 10–100 kg is added, more preferably 30–60 kg hydrogen peroxide per tonne of sludge dry substance, the hydrogen peroxide being calculated as 100% hydrogen peroxide.

According to the above described Fenton's reaction, the molar ratio of iron to hydrogen peroxide is equimolar, but it is preferred to have an excess of hydrogen peroxide (oxidiser), so that the molar ratio iron:oxidiser is from about 0.01:1 to about 1:1, more preferably from about 0.1:1 to 1:2.

The treatment with oxidiser according to the invention preferably occurs at the pH of the sludge after acid treatment. The duration of the treatment with oxidiser is preferably from about 1 min to 1.5 h, more preferably from 5 min to 1 h. The treatment with oxidiser further preferably occurs at the temperature of the sludge after acid treatment, for instance 10–40° C.

In addition to oxidation of divalent iron to trivalent iron, the adding of oxidiser causes oxidation of organic matter to, inter alia, carbon dioxide which escapes in gaseous form. Moreover a deodorisation of the sludge is obtained by the action of the hydroxyl radicals formed in Fenton's reaction. This deodorisation is effective and causes a sludge whose smell is reduced or which is practically free from smell, which means great environmental advantages. Moreover the adding of oxidiser causes sanitation of the sludge, thereby reducing or eliminating pathogenic bacteria.

A further advantage of the invention is the good filterability of the sludge in dewatering. The reason is not quite clear but will probably, in addition to the effect of the acid treatment and the oxidising treatment of the sludge, also be due to a favourable effect of the trivalent iron phosphate precipitated in oxidation. It is assumed for excellent reasons that the precipitated trivalent iron phosphate owing to its particle size and structure has a favourable effect as a filtering aid in dewatering. Thus, in the invention it has been noted that, instead of a sticky sludge which is extremely difficult to dewater according to prior-art technique, a sludge which is easy to dewater is provided according to the invention, forming a pulverulent, non-sticky product, which can easily be dried by itself in ambient air.

After the treatment with an oxidiser, the sludge is dewatered. Dewatering preferably occurs at the same pH as that of the sludge in the treatment with oxidiser, i.e. pH 1–5. Optionally, a certain adjustment of the pH of the sludge can be made in order to neutralise it, i.e. to about pH 7, but a special alkaline treatment of the sludge in order to alkaline it is not made according to the invention. This means that the pH of the sludge in dewatering is at most 7 according to the present invention.

Dewatering can take place in a single step, but is preferably divided into predewatering and final dewatering. Predewatering occurs preferably in a mechanical predewatering device, such as a centrifuge or a rotary screen. Also the final dewatering (which may constitute the only dewatering if predewatering is excluded) is mechanical dewatering. The final dewatering preferably occurs in a centrifuge, screw press, chamber filter press or band filter press.

In the invention it has unexpectedly been found that the treated sludge can be dewatered by mechanical dewatering to a high solids content, such as at least 30% by weight, preferably at least 35% by weight, more preferably 40–60% by weight, especially 40–50% by weight. The mechanical dewatering occurs, as mentioned above, for instance in a centrifuge, screw press or band filter press, more preferably in a screw press or band filter press. It must be considered surprising that such simple means make it possible to provide dewatering that is so effective. In experiments with sludge which has not been treated with acid and oxidiser, pressing in a screw press has in fact resulted in a solids content of only 28% by weight. Obviously the combination of acid treatment and subsequent treatment with an oxidiser and accompanying precipitation of trivalent iron phosphate results in dewatering of the sludge being rendered more effective in a surprising manner, so that a solids content of at least 30% by weigth, preferably at least 35% by weight can be achieved.

In order to facilitate the mechanical dewatering and render it more effective it is preferred that dewatering occur in the presence of a dewatering aid. Such dewatering aids are known and suitably consist of precipitants which can be of nonionic or ionic type, for instance polyelectrolyte of anionic or cationic type.

If a dewatering aid is used, it is preferably added before dewatering, such as before predewatering. Subsequently the predewatering of the sludge is effected, followed by the final dewatering, which preferably occurs in a screw press or band filter press.

The invention will now be further elucidated with reference to the accompanying drawing.

As stated above, the FIG. is a schematic flow diagram of a method according to the invention.

As indicated by arrow 1 at the extreme left in FIG. 1, wastewater is fed to a treatment plant, such as a municipal wastewater treatment plant 2, in which purification of the wastewater occurs in the manner described above. In purification, the produced sludge is fed to a digestion chamber (not shown) for digesting the sludge. From the digestion chamber the digested sludge 3 is fed to a reactor 4. The solids content of the digested sludge usually is about 1–6% by weight, for instance 1–3% by weight, but if desired, the sludge can be thickened before being fed to the reactor 4, for instance using a centrifuge. After being fed to the reactor, the digested sludge is subjected to acid treatment, as described above. This acid treatment occurs, as mentioned above, in one or more reactors connected in series at a pH of 1–5, preferably 1–4, at a temperature of 0–100° C., preferably 20–100° C., and for a period of 10 min to 2 h. As mentioned above, in the acid treatment there occurs some conversion of organic matter to, inter alia, carbon dioxide which escapes in gaseous form.

The acid treated sludge is then to be subjected to treatment with an oxidiser.

The sludge is fed from the acid treatment to a subsequent reactor 5, in which the oxidiser, preferably hydrogen peroxide, is added to the sludge. In the oxidising treatment, dissolved divalent iron in the sludge is oxidised to trivalent iron and forms together with the dissolved phosphorus content of the sludge trivalent iron phosphate that is precipitated. In the oxidising treatment the oxidiser reacts with divalent iron in the sludge according to the above-described Fenton's reaction. If the sludge should contain an insufficient amount of divalent iron, additional divalent iron can be added (not shown) in connection with the oxidising treatment in the reactor 5.

The oxidising treatment in the reactor 5 is preferably performed without external heating, i.e. at ambient temperature. Since Fenton's reaction is exothermal, this means that the temperature of the reaction mixture generally is in the range of about 10–40° C. The duration of the oxidising treatment may vary, but is preferably from about 1 min to 1.5 h, more preferably from 5 min to 1 h.

After the treatment with the oxidiser, in which the sludge is deodorised and sanitised and organic matter is broken down to, inter alia, carbon dioxide, a dewatering aid 7 is added to the sludge 6.

The sludge is then fed to a predewatering device 8 which preferably is a rotary screen, in order to thicken the sludge to a solids content of about 10–20% by weight, preferably about 14–16% by weight, which is suitable for feeding the thickened sludge 9 to the subsequent final dewatering device 10, which preferably is a screw press. In the screw press 10 the sludge is mechanically dewatered, preferably at a pressure of 1.5–5.0 MPa, to a solids content of at least 35% by weight, preferably 40–60% by weight. The pressed sludge 11 is discharged from the press 10 as an easily handled, non-sticky powder, which then can be dried, for instance by air drying, in order to further increase the solids content, and/or is fed to an incinerator (not shown) to be burnt to ashes. Instead of being incinerated, the pressed sludge 11 can be disposed of in some other way, for instance by depositing on landfill sites or by composting.

The following examples will elucidate the invention without, however, restricting the same.

EXAMPLE 1

Digested sludge was treated according to the invention by acid treatment, treatment with an oxidiser (hydrogen peroxide) and dewatering. The treatment took place at different temperatures. Then the contents of the following bacteria were determined: a) coliform 37° C., b) thermotolerant coliform, c) presumptive *Escherichia coli*, d) *Clostridium perifringens*, and e) *salmonella*.

In parallel the same determination was made on a sample of the same digested sludge that had not been treated according to the invention, but only heated to 70° C. for 30 min at pH 6.85. Moreover the bacterial content was determined in a blank of the digested sludge, i.e. a sample that had not been subjected to any treatment at all. The results are stated in Table 1. The Table states the sample marking kg 100% hydrogen peroxide/temp, ° C., for 30 min/pH. The values in the Table relate to the number of colony-forming units per ml of sludge having a solids content of 2.5% (cfu/ml)

TABLE 1

| Sample marking | Coliform 37° C. | Thermotol. Colif. | E. coli | C. perfringens | Salmonella |
|---|---|---|---|---|---|
| 0-sample | 910 | 520 | 520 | 21 000 | Positive* |
| 0/70/6.85 | <10 | <10 | <10 | 510 000 | Negative |
| 40/30/3.5 | <10 | <10 | <10 | 41 000 | Negative |
| 70/45/2.75 | <10 | <10 | <10 | 22 000 | Negative |
| 100/30/3.5 | <10 | <10 | <10 | 5 700 | Negative |

*Salmonella Agona

As is evident from the results, the treatment according to the invention had a favourable sanitation effect. In particular the favourable effect of the treatment using hydrogen peroxide on *Clostridium perfringens* can be noted. Furthermore the *salmonella* was eliminated from all samples according to the invention.

EXAMPLE 2

The solids content (TS=dry solids) from two dewatering devices is compared on the one hand after treatment according to the invention by acid treatment and treatment with an oxidiser (hydrogen peroxide) and, on the other hand, without treatment according to the invention.

The sludge (digested sludge) contains at the inlet to the acid treatment and at the inlet to the dewatering devices 3% TS flocculated with polymer. The dewatering devices comprise a centrifuge, in which the sludge has a retention time of less than 1 min, and after that a screw press which is preceded by a dewatering drum. The screw press applies a pressure of 50 bar and the retention time of the sludge in the screw press is 15–30 min. In the dewatering drum, the sludge is dewatered to a TS content of 10–15% and is then fed to the screw press, the TS content being further increased. The results are stated in Table 2.

TABLE 2

|  |  | Centrifuge |  | Screw press |  |
|---|---|---|---|---|---|
| TS content | Untreated | $H_2SO_4$: 360 kg/tonne TS<br>$H_2O_2$: 30 kg/tonne TS<br>Temp: 70° C. | Untreated | $H_2SO_4$: 350 kg/tonne TS<br>$H_2O_2$: 50 kg/tonne TS<br>Temp: 70° C. | |
|  | 18% | 29% | Not possible | 40% | |

As is evident from the results, the treatment according to the invention has a favourable effect in particular when using a screw press.

EXAMPLE 3

The digested sludge was treated according to the invention by acid treatment, treatment with an oxidiser (hydrogen peroxide) and dewatering using a screw press. The following results were obtained at different temperatures.

TABLE 3

| Temperature (° C.) | Hydrogen peroxide (g/kg TS) | pH | Dry solids after dewatering (%) |
|---|---|---|---|
| 25 | 100 | 3.6 | 37 |
| 30 | 100 | 3 | 39 |
| 70 | 100 | 3.5 | 47 |

As is evident from the results, the treatment according to the invention gave a clearly increased TS content with an increased temperature.

EXAMPLE 4

Experiments to resemble a continuous process, in which batches of 20 and 60 l were made. Digested sludge was acid treated and the aqueous phase was separated from the solid phase. The aqueous phase had a pH of 3–4 and the liquid was continuously treated with hydrogen peroxide for oxidation of divalent iron to trivalent iron and subsequent precipitation of trivalent iron phosphate. New sludge and aged sludge (2 weeks) were examined.

TABLE 4

| Treatment time (h) | Particle size (μm) | | | |
|---|---|---|---|---|
|  | New sludge 20 l | New sludge 60 l | Aged sludge 20 l | Aged sludge 60 l |
| 0 | 4.21 | 9.21 | 7.14 | 7.48 |
| 0.5 | 5.80 | 6.56 | 5.81 | 5.35 |
| 1 | 11.26 | 7.72 | 11.14 | 7.77 |
| 2 | 18.40 | 12.39 | 17.96 | 11.71 |
| 3 | 20.19 | 16.73 | 20.36 | 16.26 |
| 4 | 18.72 | 18.95 | 20.59 | 21.31 |
| 5 | 20.64 | 19.64 | 20.29 | 19.90 |
| 6 | 20.61 | 20.12 | 19.96 | 20.43 |

As is evident from the results, the treatment according to the invention in a stationary state produces trivalent iron phosphate particles having an average particle size of 20 μm. These particles promote improved dewatering by acting as an internally generated filtering aid.

The invention has been described above with reference to preferred embodiments, but it is to be understood that they are only elucidative and that the scope of the invention is only limited by the appended claims.

What we claim and desire to secure by Letters Patent is:
1. A method of treating, in wastewater purification, sludge containing organic matter, divalent iron and phosphorus, comprising:
   treating the sludge so that it contains dissolved iron and phosphorus at a molar ratio Fe:P of above 1:1;
   treating the sludge at 0–100° C. with an acid, wherein a pH of 1–5 is achieved for dissolution of divalent iron and phosphorus from the sludge;
   supplying the sludge with an oxidizer or mixture of oxidizers selected from hydrogen peroxide and per-compounds, whereby divalent iron is oxidized by Fenton's reaction to trivalent iron; and
   (i) trivalent iron is precipitated as trivalent iron phosphate particles to promote improved dewatering of the sludge;

(ii) free radicals with a deodorisation and sanitation effect are formed by Fenton's reaction;
dewatering the sludge at a pH of at most 7; and
recirculating the aqueous solution obtained in dewatering to the wastewater purification.

2. A method as claimed in claim 1, wherein the sludge is acid treated with sulphuric acid, formic acid or oxalic acid.

3. A method as claimed in claim 1 or 2, wherein the sludge is acid treated for 10 min to 2 h.

4. A method as claimed in claim 1, wherein the sludge that is treated is made to contain iron and phosphorus at a molar ratio Fe:P from above 1:1 to 1.5:1.

5. A method as claimed in claim 1, wherein the sludge is supplied with additional divalent iron before the adding of an oxidizer.

6. A method as claimed in claim 1, wherein the oxidizer or mixture of oxidizers is selected from at least one of hydrogen peroxide, sodium percarbonate and peracetic acid.

7. A method as claimed in claim 1, wherein the oxidizer is hydrogen peroxide.

8. A method as claimed in claim 1, wherein the sludge is supplied with hydrogen peroxide as an oxidizer in an amount of 10–100 kg, 100% hydrogen peroxide per tonne of dry solids.

9. The method according to claim 8, wherein the amount of hydrogen peroxide is 30–60 kg, 100% hydrogen peroxide per tonne of dry solids.

10. A method as claimed in claim 1, wherein the sludge is supplied with a dewatering aid before dewatering.

11. A method as claimed in claim 1, wherein the sludge is predewatered with a centrifuge or a rotary screen.

12. A method as claimed in claim 1, wherein the sludge is finally dewatered with a centrifuge, screw press, chamber filter press or band filter press.

13. A method as claimed in claim 1, wherein the sludge is dewatered to a solids content of at least 30% by weight.

14. A method as claimed in claim 1, wherein the sludge is dewatered to a solids content of 35–60% by weight.

* * * * *